July 3, 1956
F. TRINCA
2,752,786
PRESSURE INDICATORS FOR VEHICULAR TIRES
AND ALARM ACTUATORS THEREFOR
Filed July 6, 1954
5 Sheets-Sheet 3
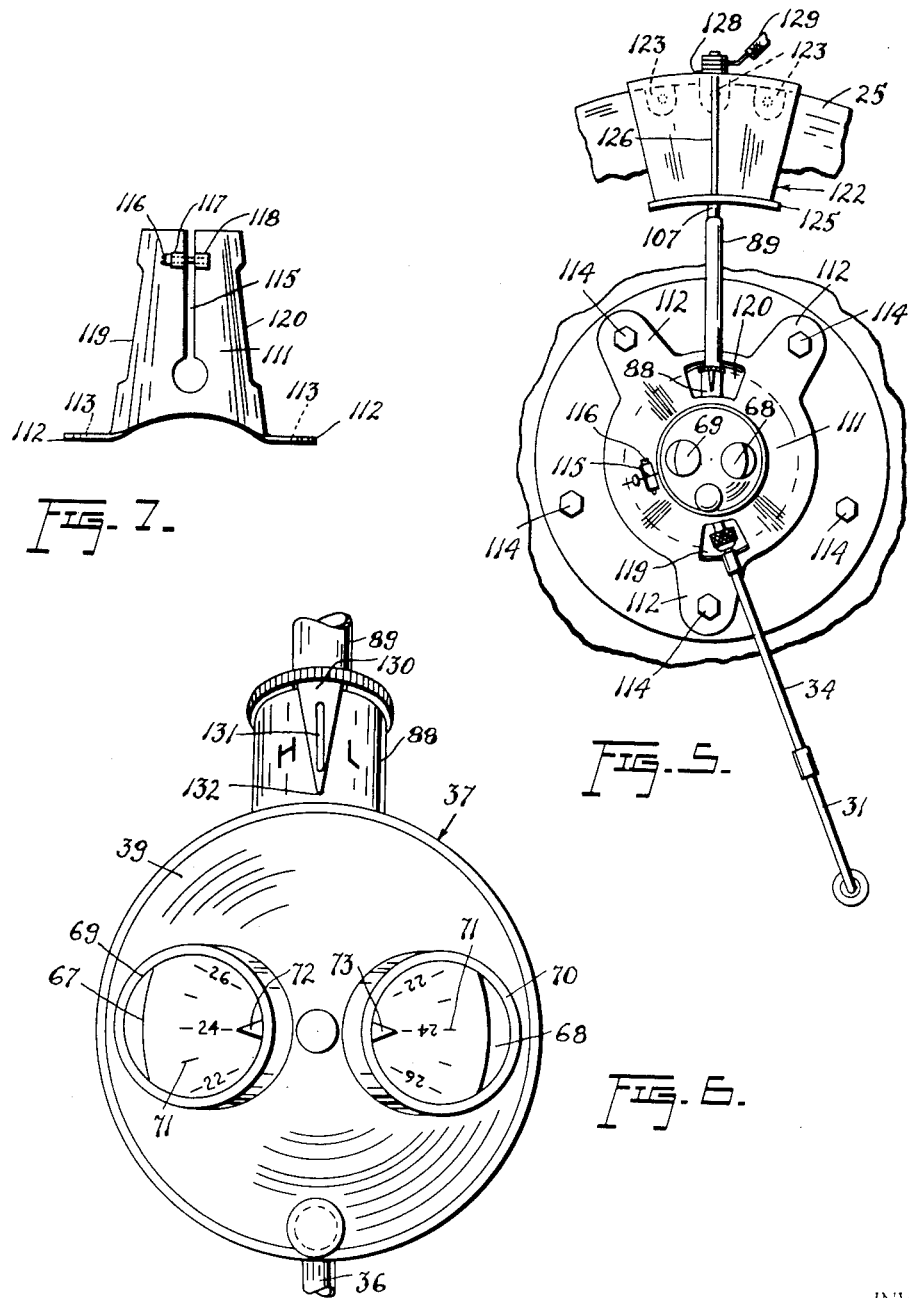
INVENTOR
*Frederick Trinca*
BY *Albert J. Kramer*
ATTORNEY

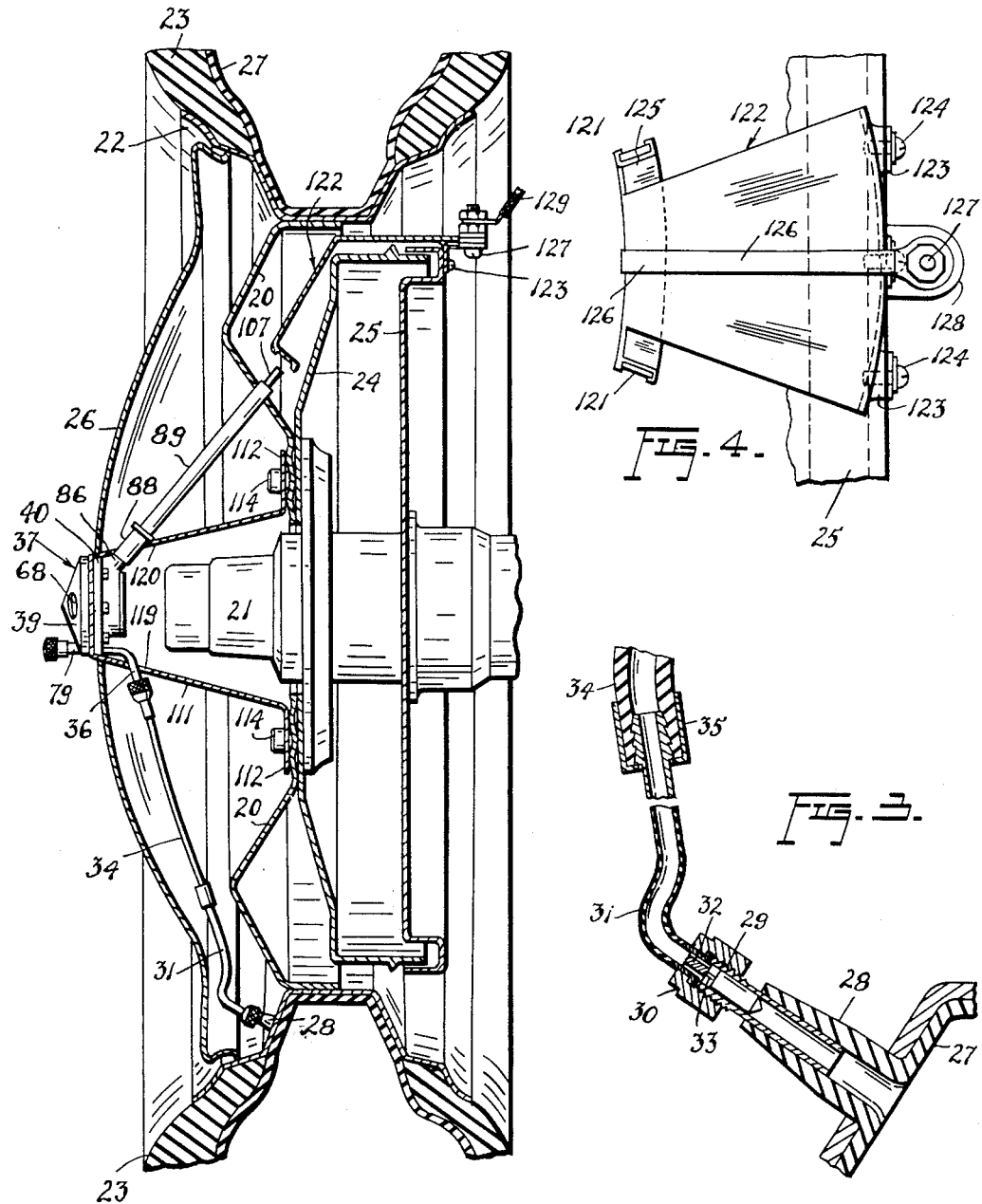

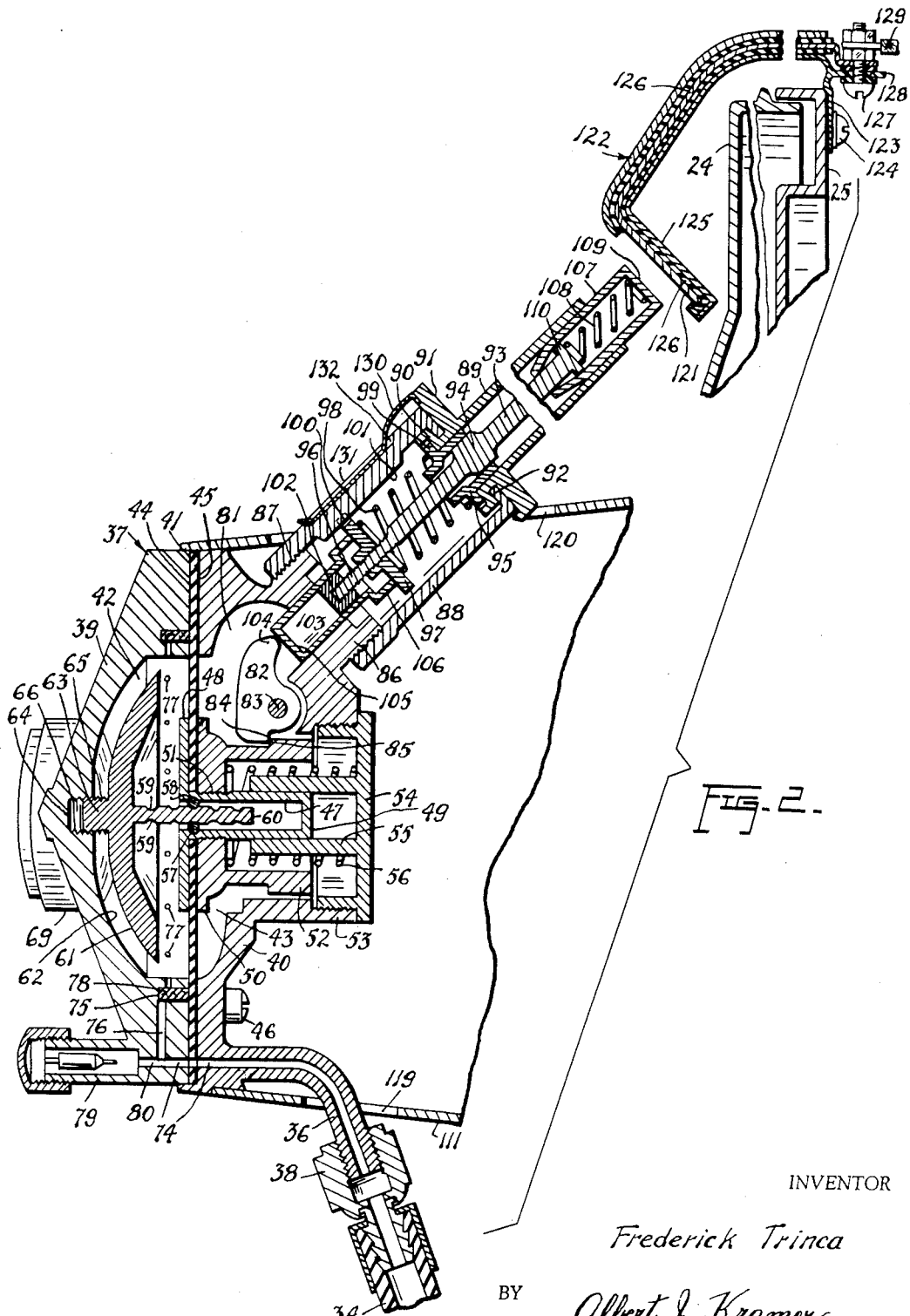

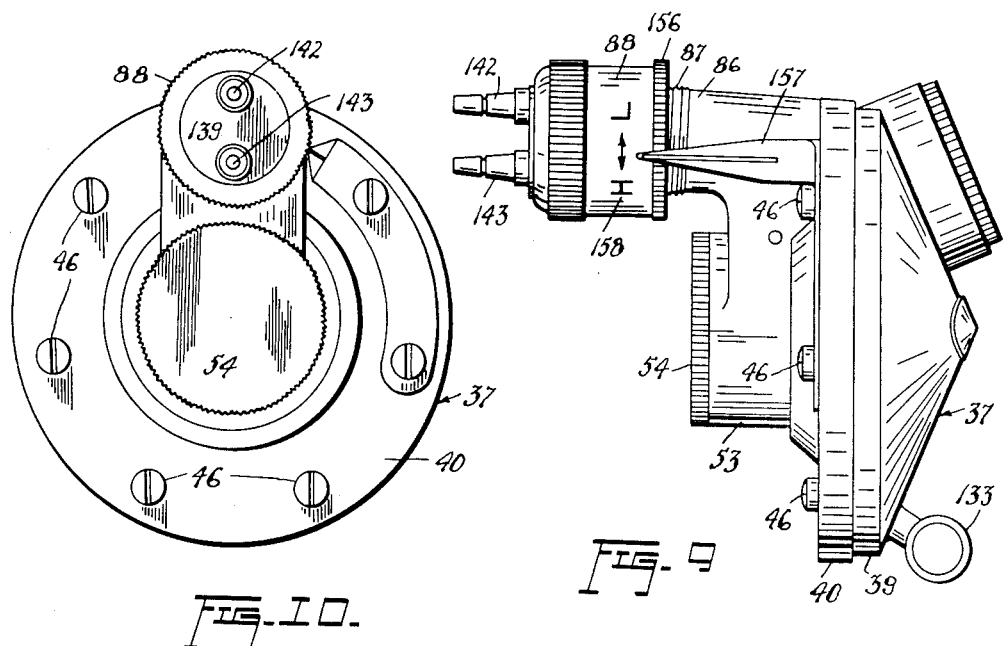
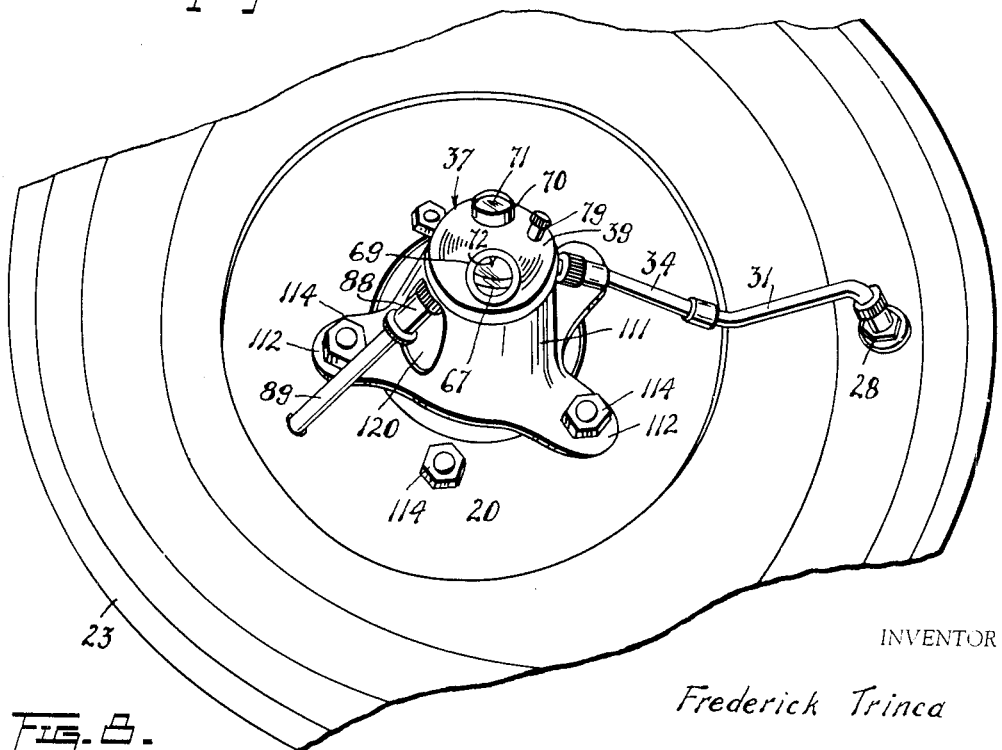

July 3, 1956
F. TRINCA
2,752,786
PRESSURE INDICATORS FOR VEHICULAR TIRES
AND ALARM ACTUATORS THEREFOR
Filed July 6, 1954
5 Sheets-Sheet 5
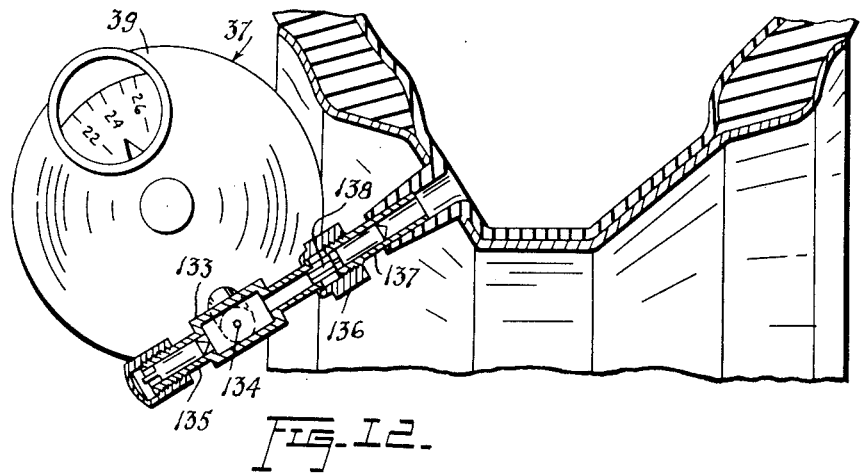
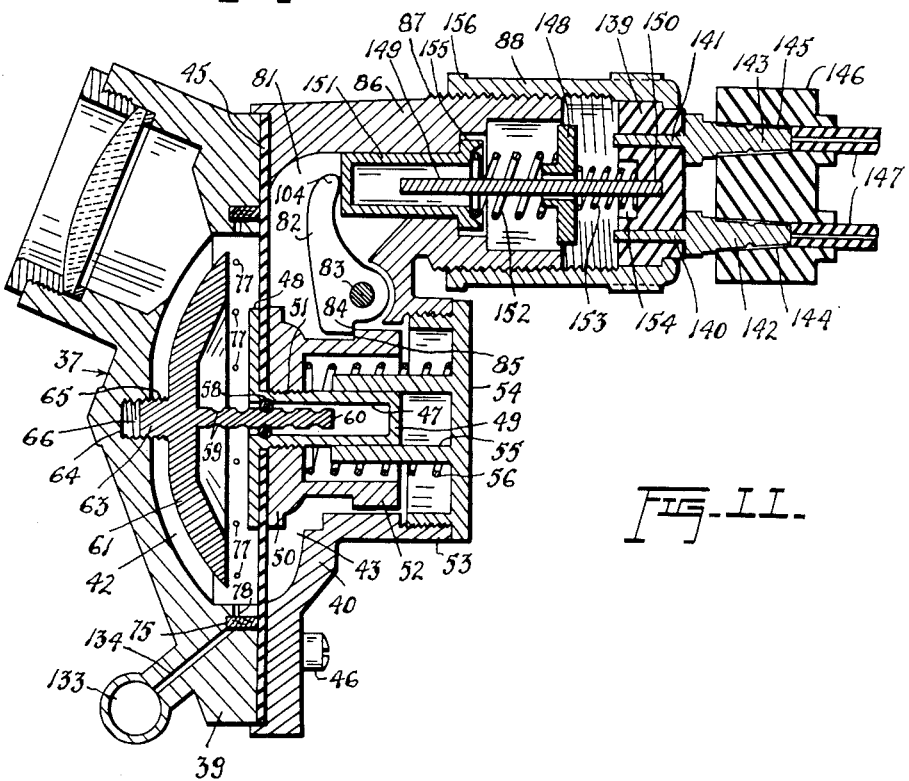
INVENTOR
*Frederick Trinca*
BY *Albert J. Kramer*
ATTORNEY United States Patent Office 2,752,786
Patented July 3, 1956

2,752,786

PRESSURE INDICATORS FOR VEHICULAR TIRES AND ALARM ACTUATORS THEREFOR

Frederick Trinca, Long Island City, N. Y.

Application July 6, 1954, Serial No. 441,238

7 Claims. (Cl. 73—390)

This is a continuation of my copending application for patent Serial No. 409,383, filed February 10, 1954.

In my said copending application for patent and other copending applications, namely, Serial No. 393,675, now Patent No. 2,710,391, filed November 23, 1953; Serial No. 388,836, now abandoned, filed October 27, 1953; and Serial Nos. 279,626, now abandoned, 279,627, now Patent No. 2,714,636 and 279,628, now abandoned, filed March 31, 1952, I have described various pneumatic tire pressure gages and improvements thereof for indicating to the operator of an automobile or other pneumatically tired vehicle, the condition of air pressure within each tire and for actuating one or more signaling devices when the air pressure drops below a predetermined value.

My present invention is concerned with improvements in such devices and has for its general object the provision of a gage of the type mentioned which is compact, easy to install, sturdy in construction and capable of withstanding the severe shocks and impact forces to which automobiles are frequently subjected.

Another object of the invention is the provision of a gage device of the type mentioned which is adjustable and which embodies an arrangement of parts that enables its installation on a wide variety of vehicles of different sizes and types.

A further object of the invention is the provision of an alarm gage for use on rotating wheels and a modified form thereof for use on spare tires.

These and other objects and advantages of the invention will appear more fully from the following description considered together with the accompanying drawing:

In the drawing:

Fig. 1 is a cross sectional view of the wheel of an automobile, partly broken away, showing an embodiment of the invention mounted thereon.

Fig. 2 is an enlarged sectional view of the same embodiment, partly broken away.

Fig. 3 is a longitudinal sectional view showing the flexible connection between the tire valve and the gage.

Fig. 4 is a plan view of the commutator member and supporting bracket.

Fig. 5 is a front elevational view of the same embodiment.

Fig. 6 is an enlarged front elevational view of the gage member, partly broken away.

Fig. 7 is a side elevational view of the wheel mount bracket.

Fig. 8 is a perspective view of the same embodiment as it appears mounted on the wheel of an automobile.

Fig. 9 is a side elevational view of a modified embodiment of the invention particularly adapted for use on the spare tire of an automobile.

Fig. 10 is a rear elevational view of the modified embodiment.

Fig. 11 is a cross-sectional view of the modified embodiment.

Fig. 12 is a plan view of the modified embodiment, partly in section, attached to a spare tire, partly broken away.

Referring with more particularity to the drawing in which like reference numerals designate like parts, in the embodiment illustrated in Figs. 1 to 8, the numeral 20 designates the wheel body of an automobile or other vehicle, fixed to and rotatable with its hub 21, and carrying a channelled rim 22 in which is mounted a pneumatic tire 23 which may be of any conventional type, including the tubeless type.

The body supports a brake drum 24 closed at its inner side by the usual cover or back plate 25 mounted on the wheel housing. These parts may be of any conventional type, the type shown in the drawing being for illustrative purposes only.

The wheel body structure illustrated may include a detachable outer cover plate 26 removably secured in place by any suitable fastening or retaining means. The tire 23 has an inner tube 27 provided with the usual valve 28 which projects through a hole in the rim 22 in the space between the cover plate 26 and the wheel body 20. In the case of tubeless tires, of course, the valve would be integral with the tire itself in the absence of the tube.

The outer end of the valve 28 is provided with the usual external threads 29 for engaging a coupler or union 30 swiveled to one end of a flexible tube 31 of rubber or any other suitable flexible material. This end of the flexible tube also contains a depression finger 32 which is adapted to contact the outer end of the usual spring biased valve stem 33 and hold it in a retracted position against the action of the biasing force when the coupler 30 is screwed home on the threads 29.

The other end of the rubber tube is secured to the end of a pipe 34 by means of a pressed ring 35. The other end of the pipe 34 is connected to the dependent tubular fitting 36 of the special gage 37 by means of a swiveled coupler 38.

The gage 37 comprises a casing formed of two principal members, namely, a hollow face or front member 39 and a rear hollow member 40 between which a flexible diaphragm 41 of rubber or other suitable material is disposed to divide the space within the casing into a front chamber 42 and a rear compartment 43, said diaphragm being thus presented as a movable wall of the chamber. The outer annular portion of the diaphragm 41 is held against annular shoulders 44 and 45 of the members 39 and 40 which are clamped together by means of bolts 46.

The diaphragm 41 is provided with a central aperture through which a hollow cylinder 47 is disposed. The front end of the cylinder is open and has an outwardly extending annular flange 48 which rests against the forward side of the diaphragm. The other end of the cylinder is closed by the end wall 49. The cylinder is held in this position by means of a nut 50 which engages a threaded portion 51 of the cylinder which lies against the rear side of the diaphragm opposite the flange 48, substantially as shown.

The nut 50 is integral with a cylindrical member 52 which projects rearwardly from the nut. A portion 53 of the housing member 40 extends rearwardly to surround the member 52 and extends beyond it to receive an end cap 54 which forms a removable end wall of the housing. The cap 54 is integral with a cylindrical sleeve 55 which extends forwardly to encompass and slidably engage the rear portion of the hollow cylinder 47 and acting as a guide therefor.

A coil spring 56 is disposed around the sleeve 55 and is compressed between the nut 50 and the cap 54, thereby biasing the diaphragm 41 forwardly.

On the inner wall of the hollow cylinder 47, there is provided a pair of diametrically opposite hemispherical recesses into which balls 57 and 58 are disposed. These balls engage helical grooves 59 of a spindle 60, on the order of a twist drill. The forward end of the spindle 60 is rigidly connected to a rotary dial 61 which follows generally the contour of the inner side 62 of forward wall of the member 39.

The forward end of the dial 61 carries a shaft 63 which is set in a socket 64 of the forward wall of the member 39. The shaft 63 is provided with external threads 65 and the socket with internal threads 66 which engage each other somewhat loosely for purposes more fully explained hereinafter.

The said forward wall is provided with a pair of diametrically opposite transparent windows 67 and 68, preferably of magnifying lenses, in frames 69 and 70, respectively, for viewing markings 71 on the dial. The dial markings are calibrated to indicate air pressure in the tire to which the device is connected, there being two duplicate sets of such markings, one for each window, and two corresponding index pointers 72, 73, one for each window also, attached to the housing member 39 and exposed to view through the windows. This facilitates reading the gage dial in any position of rotation.

Air from inside the tire is communicated to the chamber 42 through the tubular fitting 36, duct 74 of the housing, an annular chamber 75 connected at its outer end to the duct 74 by means of a cross duct 76, and apertures 77 connecting the other side of the annular chamber 75 with the chamber 42.

The annular chamber 75 is packed with felt 78 or any other porous material suitable as an air filter, to trap foreign objects and moisture from reaching the chamber 42 and damaging or exposing to possible damage moving parts with which they might come in contact, including the diaphragm which, if made of rubber, may be subject to deterioration in contact with water and other foreign objects.

The housing member 39 is surmounted by a valve 79, the body of which is firmly attached to or integral with the member and is communicated with the ducts 74 and 76 through an extension duct 80. This permits changing the amount of air in the tire to any desired pressure without disconnecting any parts of the device from the vehicle.

Air pressure in the chamber 42 acts against the diaphragm and the spring 56. When the diaphragm is in an equilibrium position under the opposing forces of the air pressure and spring 56, its relative position will be a function of the air pressure. Any change in the equilibrium will cause the diaphragm to move and carry with it the hollow cylinder member 52. This movement causes the balls 57 and 58 to act against the helical grooves 59 and to rotate the spindle 60 a corresponding amount which, in turn, rotates the dial to which the spindle is connected. The markings on the dial are arranged to give a direct reading of the pressure for any given equilibrium position of the diaphragm.

The purpose of the threads 65 and 66 is to attenuate or damp the rotation of the dial so as to prevent overriding.

The housing member 40 has a hollow enlarged portion 81 which contains a cam lever 82 pivotally carried on a shaft 83. The cam lever 82 has a rearwardly facing shoulder 84 and the cylindrical member 52 is annularly recessed to provide a forwardly facing shoulder 85 in contact with the cam shoulder 84.

A neck portion 86 having external threads 87, extends diagonally outwardly from the portion 81 and is threadedly engaged with a cylindrical barrel 88 to the other end of which an elongated tubular arm 89 projects and to which it is swiveled by flanges 90 and 91 interlocking with the flange 92 of the barrel 88. The barrel 88 and arm 89 together form a two-part housing for a plunger rod 93.

The plunger rod 93 is axially disposed in this housing and has an enlarged portion 94 which is carried in a flanged collar 95 set in the forward end of the arm 89. The forward end of the plunger rod is provided with threads 96 with which a disc 97 is engaged. A coil spring 98 in compression surrounds the plunger between the collar 95 and disc 97, one end abutting the disc and the other end abutting the flange 99 of the collar. The disc 97 is provided with a notch or radial slit 100 which is engaged by a longitudinal fin 101 projecting inwardly from the wall of the barrel 88.

The forward threaded end of the plunger rod 93 extends beyond the disc 97 and is provided with a cylindrical cap 102. The cap 102 is slidably disposed in a tubular member 103, said tubular member being, in turn, slidably disposed in the neck portion 86 which is provided with a smooth bore for that purpose and communicates with the hollow portion 81 containing the cam lever 82. The cam lever 82 has an eccentric finger 104 which abuts the end wall 105 of the member 103, substantially as shown. The opposite end of the member 103 is open and has a portion 106 which bears against the disc 97. By these means a rotation of the plunger rod 93 relative to the barrel 88 will change the position of the plunger rod axially relative to its housing.

The rearward end of the member 89 carries a finger 107 which is connected to the corresponding end of the plunger rod 93. The finger 107 is hollow and the end of the plunger rod is set inside of it as shown. A coil spring 108 in compression is carried within the finger and is abuttingly engaged with the rearward end wall 109 and a flange 110 of the plunger rod. The forward end of the finger is bent inwardly behind the flange 110 to contain it.

The gage is mounted on a special type bracket 111 which, in turn, is mounted on the wheel. The bracket is, generally, a frustro-conically shaped shell and has flanged portions 112 extending outwardly at the base. These flanged portions are provided with apertures 113 to register with a few of the usual lug bolts 114 used to secure the automobile wheel to the brake drum or to some member connected thereto. The body of the bracket surrounds the wheel hub cap 21 as shown and projects beyond it. The gage is set in the front end of the bracket and is secured thereto in any suitable manner. A preferred means is illustrated in the drawing as a clamping arrangement provided by a slot 115 in one side of the body of the bracket (see Fig. 7) to effect an expansible rim in contact with a portion of the body of the gage, and a clamping bolt 116 engaging lugs 117 and 118 on either side of the slot near the forward end of the bracket, substantially as shown. Where the wheel of the vehicle includes a cover plate 26, an aperture is provided in the center of the plate to expose the face of the gage.

The bracket is also provided with apertures 119 and 120, through which the fitting 36 and barrel 88 with arm 89 project. These slots are sufficiently wide to provide a degree of angular adjustment of the gage relative to the bracket for properly positioning it.

When the gage and bracket are thus mounted, the arm 89 projects diagonally rearward toward a commutator member which comprises an electrical conducting metallic strip 121, such as copper, brass, or other suitable material, carried on a bracket 122. The bracket is secured by lobe flanges 123 and screws or bolts 124 to the back plate 25. This is preferably mounted so that the strip 121 faces generally downward so as to prevent or minimize the collection of dust or dirt that might momentarily interfere with the making of an electrical contact between the strip and the end of the finger member 109, although contact will eventually be made even if such dust or dirt is present, because it would be worn away upon a few revolutions of the wheel when the end of the finger member is in contact relation with the strip.

The strip 121 is secured to a flat portion 125 on the forward end of the bracket and is electrically insulated therefrom by a lining of insulating material 126, such as waterproof paper, rubber, asbestos, or any other suitable material interposed between the strip and the portion 125. The strip 121 is electrically connected to one end of an insulated conductor 126, the other end of the conductor strip being connected to an electrical terminal 127 on a lobe 128 of the bracket. The terminal 127 is, in turn, connected to an electric wire 129 in series with an alarm system (not shown) which includes a grounded connection to bring into the electrical circuit the body of the gage and its dependent arm 89 and finger 107.

Consequently, a contact between the finger 107 and the strip 121 closes the electrical circuit and actuates the alarm system. The alarm may be of the audio type, such as a buzzer, or the visual type, such as a blinking light on the instrument panel of the vehicle, but preferably includes both such types as shown in said copending application, Ser. No. 393,675.

By rotating the arm 89 relative to the hollow barrel 88, the outer end of the finger 107 can be protracted or retracted in relation to the strip 121. With the air in the tire at its optimum or predetermined pressure, the distance between the strip and the finger can be made to obtain a contact between these members and hence to excite the alarm system, for any given pressure drop, such as one, two, or three pounds per square inch, by merely rotating the arm 89. To maintain this selected position, a spring clip 130 is secured at one end to the arm 89 and it has a flat resilient portion 131 which registers with a groove 132 on the outer surface of the barrel 88. The device is generally designed so that one full turn of the arm changes the adjustment by one pound per square inch of pressure, one way or the other, depending on the direction of rotation. The letters "H" and "L" (see Fig. 6) are placed on either side of the groove to designate the proper direction of rotation for a higher or lower warning pressure.

With the device installed and adjusted in this manner, it may be seen that as the pressure drops in the chamber 42, the diaphragm is moved forwardly a corresponding distance under the action of the spring 56 and carries with it the member 52. This forces the cam lever 82 to rotate clockwise, as viewed in Fig. 2, thereby urging the plunger rod 93 rearwardly a corresponding distance. When this displacement is sufficiently great to cause a contact between the finger 107 and the strip 121, the alarm signal or signals are excited and the operator is thus warned to correct the existing deficiency. Where all the gages are connected to a central alarm system, the alarm will be excited if any one of the tires has a pressure deficiency. The specific one having such a deficiency can be readily determined by checking the dial readings on each gage.

Should there be a sudden drop in pressure in the tire, such as by a blowout, or from other causes, the excessive displacement of the plunger toward the strip will not result in any damage to the device because of the cushioning provided by the finger spring 108, the outer ends of the strip 121 being curved rearwardly (see Fig. 4) in an amount sufficient to insure the fact that the finger will not be side swiped as it approaches the bracket in its orbit of revolution.

The modified embodiment illustrated in Figs. 9 to 12 is for use on the spare tire of a vehicle and is essentially similar to the embodiment described above, except that since the wheel is stationary, it is so modified as to connect it directly to the valve of the tube and a substitute arrangement is provided for making an electrical contact when the pressure drops. Also, only one window is needed for reading the gage dial.

These modifications eliminate the dependent fitting 36 of the previous embodiment and the substitution thereof of a hollow tubular member 133 which communicates with the chamber 42 by a duct 134. The member 133 carries an air valve 135 at one end and a swiveled coupler 136 at the other end, the latter being for connection to the valve 137 of the tire. A valve stem depressor 138 is also provided to hold open the valve stem when it is in place.

The arm 89 of the previous embodiment is also eliminated, and there is substituted therefor an end wall 139 of an electrical insulating material, such as bakelite, in which there is embedded a pair of electrical prongs 140 and 141. Exterior portions 142 and 143 of these prongs are adapted to be removably engaged with corresponding sockets 144 and 145 of an electrical plug 146 on one end of a double wire line 147 leading to and being connected to the same or a similar electrical alarm system.

The prongs 140 and 141 extend inwardly a short distance beyond the inner side of the end wall 139 and are there presented as contact points for a floating metal disc 148. The disc 148 is slidably mounted on an axial post 149. One end of the post rests in a socket 150 of the end wall 139. The other end projects upwardly into the member 151 which corresponds to and performs the same function as the member 103 of the embodiment of Figs. 1 to 8. The disc 148 is held between coil springs 152 and 153. The coil spring 153 has one end resting in a sump 154 of the end wall 139, and the other end abutting the disc 148. The other coil spring 152 has one end abutting the other side of the disc 148 and its other end in contact with an annular recess 155 of the member 151. The spring 153 is weaker than the spring 152. Consequently, by rotating the barrel 88 on the neck 86, tension in both springs is changed, but unequally, thereby changing the position of the disc 148 relative to the inner contact end of the prongs 140 and 141. A drop in pressure in the tire causes the disc to be moved toward the prongs and when the pressure has dropped sufficiently, contact is made and the alarm circuit is energized.

The barrel 88 is provided with a knurled rim 156 which engages a spring clip or tongue 157 on the body of the gage to frictionally hold the member in adjusted positions on the neck and provide a reference point for directional markings 158 on the outer surface of the barrel.

Having thus described my invention, I claim:

1. A pneumatic tire pressure gage having a pressure chamber and means for communicating said chamber with the interior of an inflated pneumatic tire, said gage having movable means for indicating changes in pressure, said means being visible from the exterior, a bracket for concentrically mounting the gage on a vehicle tire wheel for simultaneous rotation coaxially therewith and to expose to view said movable means in the normal position of the gage, an arm connected to and projecting from the gage, a finger slidably mounted on said arm and normally extending beyond the outer end thereof, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, an insulated electrical conductor attached to said strip, and means responsive to decreasing pressure changes in said chamber for moving said finger relative to the arm in a direction toward said strip.

2. A pneumatic tire pressure gage having a pressure chamber and means for communicating said chamber with the interior of an inflated pneumatic tire, said gage having movable means for indicating changes in pressure, said means being visible from the exterior, a bracket for concentrically mounting the gage on a vehicle tire wheel for simultaneous rotation coaxially therewith and to expose to view said movable means in the normal position of the gage, an arm connected to and projecting from the gage, a finger slidably mounted on said arm and normally extending beyond the outer end thereof, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, an insulated electrical conductor attached to said strip, means responsive to decreasing pressure changes in said chamber for moving said finger relative to the arm in a direction toward said strip, and means for presetting the position of said finger relative to the arm and strip independently of the pressure in said chamber.

3. A pneumatic tire pressure gage having a pressure chamber, said chamber having a movable wall responsive to pressure changes therein, said gage having means for indicating said pressure changes, said means being visible from the exterior, means for communicating said chamber with the interior of an inflated pneumatic tire, a bracket for concentrically mounting the gage on a vehicle tire wheel for simultaneous rotation coaxially therewith, an arm connected to and projecting from the gage, a finger slidably mounted on said arm and normally extending beyond the outer end thereof, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, an insulated electrical conductor attached to said strip, a member carried by said diaphragm and movable therewith, and means operatively connecting said member and said finger for coaction.

4. A pneumatic tire pressure gage having a pressure chamber, said chamber having a movable wall responsive to pressure changes therein, said gage having means for indicating said pressure changes, said means being visible from the exterior, a member carried by and movable with said wall, means for communicating said chamber with the interior of an inflated pneumatic tire, a bracket for concentrically mounting the gage on a vehicle tire wheel for simultaneous rotation coaxially therewith, an arm connected to and projecting from the gage, a finger slidably mounted on said arm and normally extending beyond the outer end thereof, a plunger rod slidably carried by the arm and supporting said finger at one end thereof, resilient means biasing said plunger rod in the opposite direction, a lever having one arm biased to rotate in one direction by said plunger rod and another arm biased to rotate in the opposite direction by said diaphragm carrying member, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, and an insulated electrical conductor attached to said strip.

5. A pneumatic tire pressure gage having a pressure chamber, said chamber having a movable wall responsive to pressure changes therein, a member carried by and movable with said wall, means for communicating said chamber with the interior of an inflated pneumatic tire, a bracket for mounting the gage on a vehicle tire wheel for rotation therewith, an arm connected to and projecting from the gage, a finger slidably mounted on said arm and normally extending beyond the outer end thereof, a plunger rod slidably carried by the arm and supporting said finger at one end thereof, resilient means biasing said plunger rod in the opposite direction, a lever having one arm biased to rotate in one direction by said plunger rod and another arm biased to rotate in the opposite direction by said diaphragm carrying member, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, an insulated electrical conductor attached to said strip, said arm comprising a cylindrical housing, said plunger rod being longitudinally disposed and longitudinally displaceable within the housing, a member threadedly engaged with the rod, an extension member telescopable with said rod in contact with said threadedly engaged member, means for rotating said rod relative to the threadedly engaged member for changing the telescopable relation between the rod and the extension member, and resiliently yieldable means for urging the extension member in contact with the lever.

6. A pneumatic tire pressure gage as defined by claim 5 in which the housing for the plunger rod comprises two cylindrical parts rotatable relative to each other, the threadedly engaged member being fixed against rotation in one of said parts and the plunger rod being in frictional contact with the other part for rotation therewith relative to the threadedly engaged member.

7. A pneumatic tire pressure gage having a pressure chamber and means for communicating said chamber with the interior of an inflated pneumatic tire, a bracket for mounting the gage on a vehicle tire wheel for rotation therewith, said bracket comprising a frusto-conical shell, flange members at one end of the shell, said flange members having apertures to register with retaining lugs of the wheel, the other end of the shell having an expansible rim adapted to engage a body portion of the gage, means for drawing and holding the expansible rim tightly about said body portion, an arm connected to and projecting from the gage, a finger slidably mounted on said arm and normally extending beyond the outer end thereof, an electrical conducting strip adjacent the orbit of revolution of the outer end of the said finger and having at least a portion thereof substantially parallel to said orbit, a bracket for supporting said strip in a fixed position, electrical insulating means between the strip and the bracket supporting it, an insulated electrical conductor attached to said strip, and means responsive to decreasing pressure changes in said chamber for moving said finger relative to the arm in a direction toward said strip.

References Cited in the file of this patent

UNITED STATES PATENTS

| | | |
|---|---|---|
| 1,882,661 | Guthrie | Oct. 18, 1932 |
| 1,956,578 | Johnston | May 1, 1934 |
| 2,239,676 | Henry | Apr. 29, 1941 |
| 2,334,443 | Schubert | Nov. 16, 1943 |
| 2,362,883 | Ceil | Nov. 14, 1944 |
| 2,417,940 | Lehman | Mar. 25, 1947 |
| 2,445,959 | Luper | July 27, 1948 |
| 2,447,777 | Slovack | Aug. 24, 1948 |
| 2,481,864 | Peck | Sept. 13, 1949 |
| 2,526,124 | Dobson | Oct. 17, 1950 |
| 2,686,445 | Keck | Aug. 17, 1954 |